(12) United States Patent
Roark

(10) Patent No.: US 8,983,253 B2
(45) Date of Patent: Mar. 17, 2015

(54) HYBRID CABLES HAVING VARYING CONDUCTOR TYPES

(75) Inventor: Bryan R. Roark, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 377 days.

(21) Appl. No.: 13/400,383

(22) Filed: Feb. 20, 2012

(65) Prior Publication Data

US 2012/0217039 A1    Aug. 30, 2012

Related U.S. Application Data

(60) Provisional application No. 61/447,215, filed on Feb. 28, 2011.

(51) Int. Cl.
*G02B 6/44* (2006.01)
*H01B 7/00* (2006.01)
*H01B 11/22* (2006.01)

(52) U.S. Cl.
CPC .............. *H01B 7/0054* (2013.01); *H01B 7/009* (2013.01); *H01B 11/22* (2013.01)

USPC ............................................ 385/101; 385/109

(58) Field of Classification Search
None
See application file for complete search history.

(56) References Cited

U.S. PATENT DOCUMENTS

| | | | | |
|---|---|---|---|---|
| 5,913,003 | A * | 6/1999 | Arroyo et al. | 385/101 |
| 6,236,789 | B1 * | 5/2001 | Fitz | 385/101 |
| 8,244,087 | B2 * | 8/2012 | Sales Casals et al. | 385/101 |
| 2002/0110339 | A1 * | 8/2002 | Dittmann | 385/101 |
| 2007/0280610 | A1 * | 12/2007 | Mallya et al. | 385/101 |
| 2008/0105449 | A1 * | 5/2008 | Kenny et al. | 174/34 |
| 2012/0008906 | A1 * | 1/2012 | Han et al. | 385/101 |
| 2012/0045186 | A1 * | 2/2012 | Wessels et al. | 385/113 |

* cited by examiner

*Primary Examiner* — Tina Wong

(57) ABSTRACT

A hybrid cable has optical conductors and electrical conductors. The electrical conductors are selected to have varying resistances per unit length, depending upon the distance from a power source at which the conductor is expected to terminate. The use of varying resistance conductors can be used to balance the power supplied to external devices and to lower cable cost, size, and weight.

15 Claims, 1 Drawing Sheet

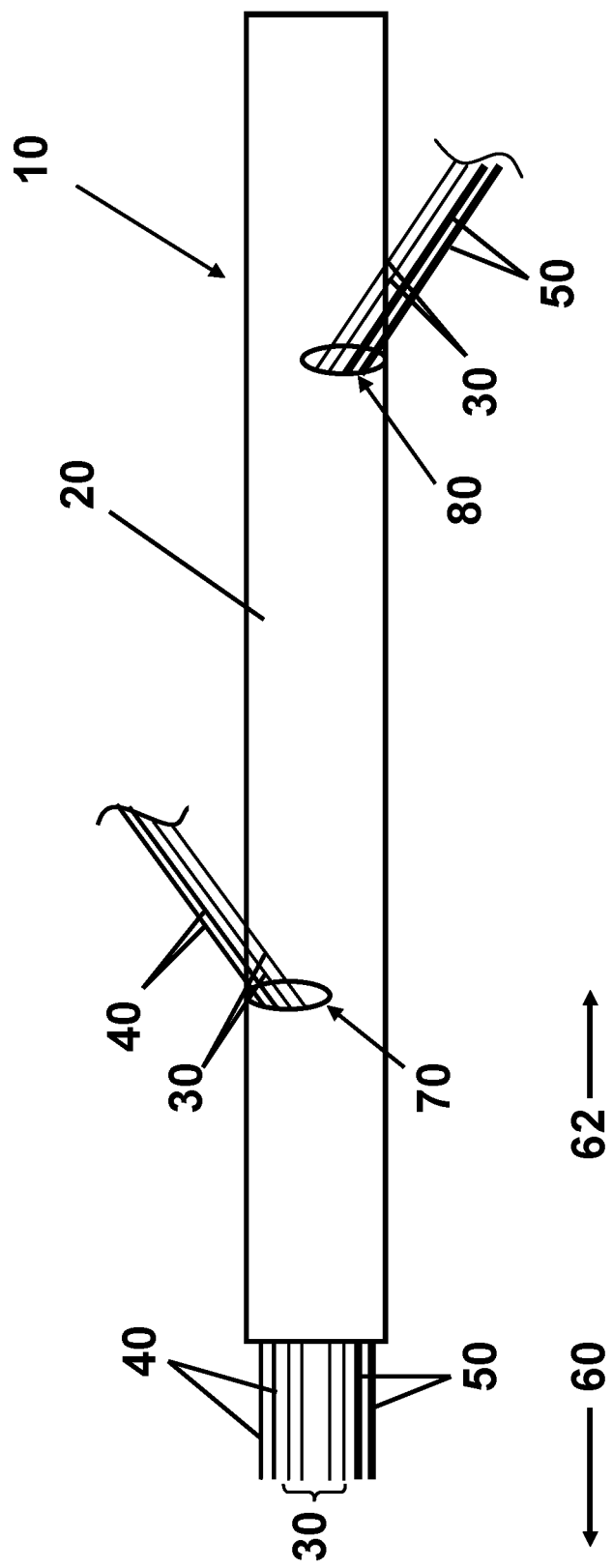

HYBRID CABLES HAVING VARYING CONDUCTOR TYPES

PRIORITY APPLICATION

This application claims the benefit of priority under 35 U.S.C. §119 of U.S. Provisional Application No. 61/447,215, filed on Feb. 28, 2011, the content of which is relied upon and incorporated herein by reference in its entirety.

SUMMARY

According to a first aspect, a hybrid cable assembly comprises a jacket, at least one first electrical conductor disposed within the jacket, the first electrical conductor having a first resistance per unit length, and at least one second electrical conductor disposed within the jacket, the second electrical conductor having a second resistance per unit length, and a plurality of optical fibers. The first resistance per unit length is greater than the second resistance per unit length.

According to a second aspect, a method of connecting a hybrid cable assembly to remote devices comprises providing a cable assembly comprising at least one first electrical conductor pair, the first electrical conductor having a first resistance per unit length; at least one second electrical conductor pair, the second electrical conductor having a second resistance per unit length; and a plurality of optical fibers, wherein the first resistance per unit length is greater than the second resistance per unit length. The method further comprises electrically connecting the cable assembly to a power source; connecting the at least one first electrical conductor pair to a first remote device at a first tap location; and connecting the at least one second electrical conductor pair to a second remote device at a second tap location, the second tap location being downstream from the first tap location in relation to the power source.

According to the above aspects, the use of varying resistance conductors can be used to balance the power supplied to external devices and to lower cable cost, size, and weight, as well as providing additional advantages.

BRIEF DESCRIPTION OF THE DRAWINGS

The present invention is illustrated and described herein with reference to the various drawings, in which like reference numbers are used to denote like system/assembly components and/or method steps, as appropriate, and in which:

FIG. 1 is cross-sectional view of a hybrid cable assembly according to a first embodiment.

DETAILED DESCRIPTION

FIG. 1 illustrates a midspan section of a hybrid cable assembly 10 having both optical fibers and metallic electrical conductors. The cable assembly 10 includes a jacket 20 surrounding a group of optical fibers 30, a first group of electrical conductors 40, and a second group of electrical conductors 50.

The cable assembly 10 can be of the type used to provide data communications and power in distributed antenna systems. In such applications, the electrical conductors 40, 50 can provide, for example, AC and/or DC power to remote devices such as antenna units (not shown), and the optical fibers 30 can provide voice, data, and other communications signals to the remote devices. The remote antenna units can include active electronics and RF transmitting elements powered by the electrical conductors 40, 50. The cable assembly 10 can be, for example, connected to a source of downloaded communications data and to a source of electrical power connected to an upstream end of the assembly. The data and/or power sources are located in an upstream direction generally indicated by the arrow 60. A number of remote devices such as remote antenna units may be located downstream from data/power sources in a downstream direction generally indicated by the arrow 62.

In one application, to provide power and data connectivity to remote devices, tap points are cut into the cable jacket 20 and selected optical fibers and electrical conductors are connected to one or more remote devices through the tap points. In FIG. 1, a first tap location 70 is formed in the jacket 20 at a first location along the cable assembly 10, and a second tap location 80 is formed in the cable assembly jacket 20 at location downstream from the first tap location 70. According to one aspect of the present embodiment, the electrical conductors in the first group 40 have a higher resistance per unit length than the electrical conductors in the second group 50. The difference in resistance per unit length can be used to compensate for the difference in distance between the power source and the two tap points 70, 80.

The first group of conductors 40 can include, for example, one or more pairs of conductors capable of providing AC and/or DC power to remote devices. The conductor pairs can be, for example, metallic, twisted pair conductors. The second group of conductors 50, and additional groups, if present, can also include twisted pair conductors.

The difference in resistance per unit length can be accomplished by, for example, using similar conductive materials in the conductors 40, 50, but using conductors of larger cross-section for the second group 50. For example, the conductors in the first group 40 can be 20 AWG conductors, and the conductors in the second group 50 can be 16 AWG conductors. Alternatively, more highly conductive materials can be used in the second group 50. The resistance, measured in for example, ohms per unit length, can be at least ten per cent greater in the first group of conductors 40. In another embodiment, resistance per unit length, can be at least twenty per cent greater in the first group of conductors 40.

Accordingly, rather than using heavier conductors to provide power to all tap points, smaller and cheaper conductors can be used to provide power to tap locations connected by a shorter conductor length. The overall cost, as well as the size and weight of the assembly 10 can thereby be reduced. Smaller, lighter assemblies are also easier for technicians to install. The resistance of the various conductors 40, 50 can also be calculated so that all of the tap points along the assembly receive approximately the same power.

According to the present embodiments, power supply to remote devices at different tap locations is passively balanced by the selection of certain conductor types. Active power conditioning at the source is therefore not necessary. In one embodiment, the conductors of various groups can thus be connected at a single terminal.

In the arrangement shown in FIG. 1, the tap points can be used to connect any number of optical and electrical conductors to one or more devices. The devices can be, for example, opto-electronic devices utilizing both electrical and optical communication signals, as well as electrical power. The exemplary cable assembly 10 includes four optical fibers and four conductors accessed at two tap points. Any number of fibers and tap points may be included, however.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A hybrid cable assembly, comprising:
   a jacket;
   at least one first electrical conductor disposed within the jacket, the first electrical conductor having a first resistance per unit length;
   at least one second electrical conductor disposed within the jacket, the second electrical conductor having a second resistance per unit length; and
   a plurality of optical fibers, wherein
   the first resistance per unit length is greater than the second resistance per unit length, wherein the first resistance per unit length is greater than the second resistance per unit length by at least ten per cent.

2. The cable of claim 1, wherein the plurality of fibers comprises at least four optical fibers.

3. The cable of claim 1, wherein the at least one first electrical conductor comprises at least two electrical conductors.

4. The cable of claim 1, wherein the at least one second electrical conductor comprises a twisted pair of electrical conductors.

5. The cable of claim 1, wherein the first resistance per unit length is greater than the second resistance per unit length by at least twenty per cent.

6. The cable of claim 1, wherein the at least one first electrical conductor is in a first group, wherein the at least one second electrical conductor is in a second group, and wherein conductors in the first group are metallic and each conductor in the first group has a smaller cross-sectional metallic area than a cross-sectional metallic area of conductors in the second group.

7. The cable of claim 1, wherein the jacket is polymeric.

8. A method of connecting a hybrid cable assembly to remote devices, comprising:
   providing a cable assembly comprising at least one first electrical conductor pair, the first electrical conductor having a first resistance per unit length; at least one second electrical conductor pair, the second electrical conductor having a second resistance per unit length; and a plurality of optical fibers, wherein the first resistance per unit length is greater than the second resistance per unit length, wherein the first resistance per unit length is greater than the second resistance per unit length by at least ten per cent;
   electrically connecting the cable assembly to a power source;
   connecting the at least one first electrical conductor pair to a first remote device at a first tap location; and
   connecting the at least one second electrical conductor pair to a second remote device at a second tap location, the second tap location being downstream from the first tap location in relation to the power source.

9. The method of claim 8, further comprising connecting at least one of the optical fibers to the first remote device.

10. The method of claim 9, further comprising connecting at least one of the optical fibers to the second remote device.

11. The method of claim 8, wherein both conductors in the first electrical conductor pair are metallic and each conductor in the first group has a smaller cross-sectional metallic area than a cross-sectional metallic area of both conductors in the second electrical conductor pair.

12. The method of claim 8, wherein the jacket is polymeric.

13. A method of providing data and power to remote devices, comprising:
   providing a cable assembly comprising at least one first electrical conductor, the first electrical conductor having a first resistance per unit length; at least one second electrical conductor, the second electrical conductor having a second resistance per unit length; and a plurality of optical fibers, wherein the first resistance per unit length is greater than the second resistance per unit length, wherein the first resistance per unit length is greater than the second resistance per unit length by at least ten per cent, and wherein the at least one first conductor and the at least one second conductor are connected to at least one power source;
   providing power to a first remote device from the power source via the at least one first electrical conductor at a first tap location;
   providing power to a second remote device from the power source via the at least one second electrical conductor at a second tap location, the second tap location being downstream from the first tap location in relation to the power source; and
   providing optical communications signals to the first remote device via at least one of the optical fibers.

14. The method of claim 13, wherein the at least one first conductor and the at least one second conductor are connected at the same terminal and receive the same electrical input.

15. The method of claim 13, wherein the at least one first electrical conductor comprises at least two electrical conductors and the at least one second electrical conductor comprises at least two electrical conductors.

* * * * *